US005553143A

United States Patent [19]
Ross et al.

[11] Patent Number: 5,553,143
[45] Date of Patent: Sep. 3, 1996

[54] METHOD AND APPARATUS FOR ELECTRONIC LICENSING

[75] Inventors: Cliff D. Ross, Pleasant Grove; Neil W. Taylor, Springville; Kevin W. Kingdon, Orem; Howard R. Davis, Salem; Drew Major, Orem, all of Utah

[73] Assignee: Novell, Inc.

[21] Appl. No.: 192,166

[22] Filed: Feb. 4, 1994

[51] Int. Cl.⁶ .................................................... H04K 1/00
[52] U.S. Cl. ............................................. 380/25; 380/4
[58] Field of Search .............................. 380/3, 4, 23, 24, 380/25, 49, 50

[56] References Cited

U.S. PATENT DOCUMENTS

| | | | |
|---|---|---|---|
| 4,924,378 | 5/1990 | Hershey et al. | 364/200 |
| 4,937,863 | 6/1990 | Robert et al. | 380/4 |
| 4,941,175 | 7/1990 | Enescu et al. | 380/4 |
| 5,023,907 | 6/1991 | Johnson et al. | 380/4 |
| 5,047,928 | 9/1991 | Wiedemer | 380/4 |
| 5,138,712 | 8/1992 | Corbin | 380/4 X |
| 5,260,999 | 11/1993 | Wyman | 380/4 |
| 5,319,705 | 7/1994 | Halter et al. | 380/4 |
| 5,343,526 | 8/1994 | Lassers | 380/4 |
| 5,343,527 | 8/1994 | Moore | 380/4 |
| 5,349,642 | 9/1994 | Kingdon | 380/25 |
| 5,371,792 | 12/1994 | Asai et al. | 380/4 |
| 5,438,508 | 8/1995 | Wyman | 380/4 |

Primary Examiner—David C. Cain
Attorney, Agent, or Firm—Snell & Wilmer, L.L.P.

[57] ABSTRACT

The present invention allows for the electronic management and enforcement of software licenses. The present invention can be used in a network or non-network environment to facilitate product licensing and upgrades. Further, the present invention accommodates the use of compact disc read-only memory (CD ROM) product distribution. Further, the present invention can retain useful, after-market information. The present invention provides the ability to implement a license policy. Further, the license policy can be implemented or modified without requiring a new version of the associated product. The present invention provides the ability to create electronic licenses. Further, the present invention provides the ability to extract and transfer licenses from an inventory of licenses to a final distribution media. Licenses can be transferred to a reseller in batches. A reseller can extract unused licenses from these batches to generate licenses. An optional companion license can be generated. Installed licenses can be managed and enforced by the present invention. Further, Upgrades (e.g., version and connections) can be accomplished independent of the product. License documents can be used to retain information related to a license. Portions of a license document can be encrypted using a private key and message digests. The encrypted result can be stored in the license document, and examined to validate a license. License documents can be created in batches. One or more licenses in a batch of licenses can be enabled to create a software license.

40 Claims, 9 Drawing Sheets

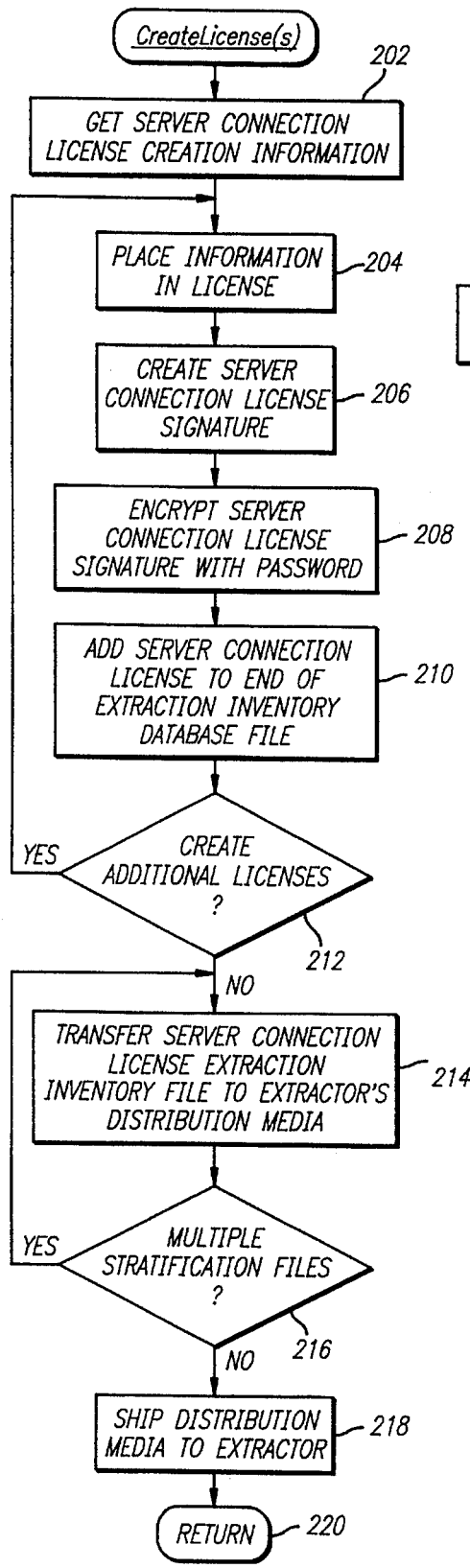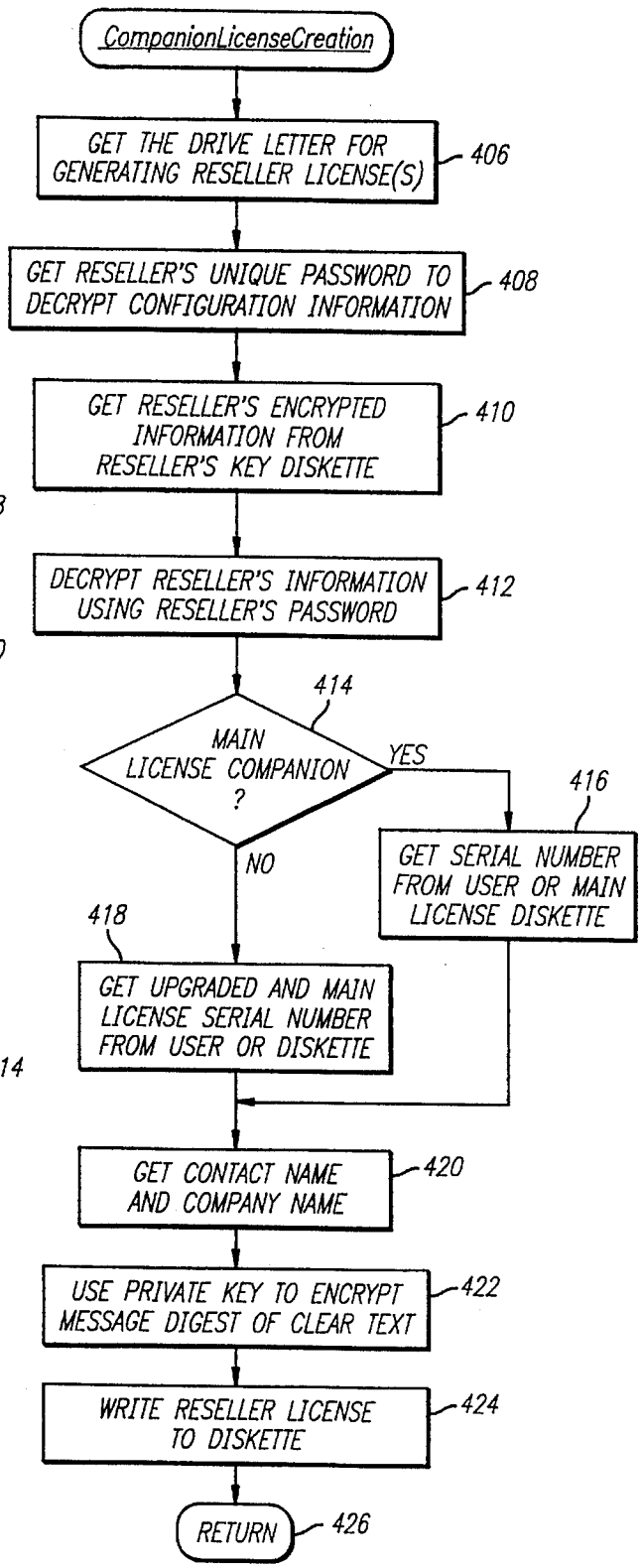

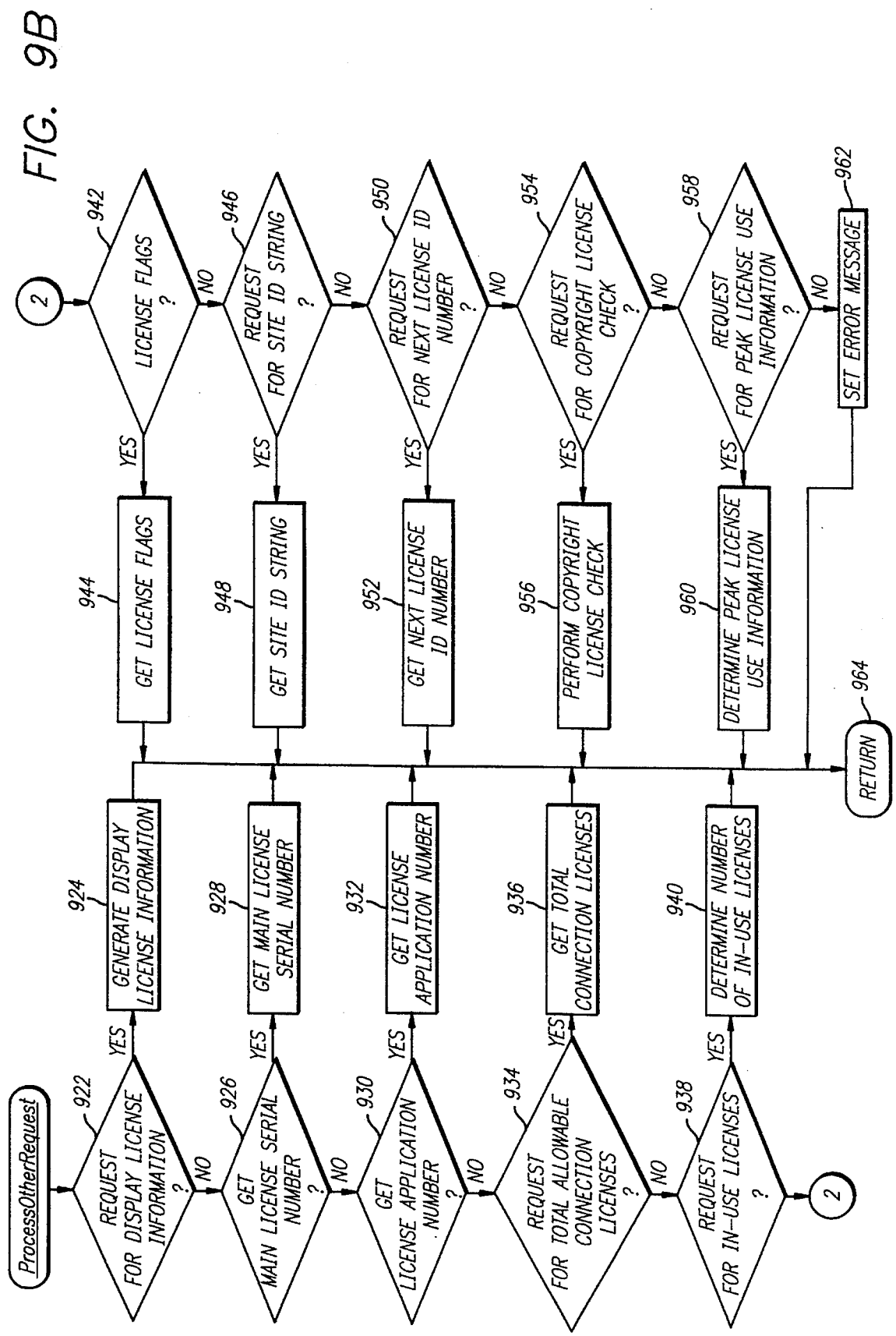

5,553,143

METHOD AND APPARATUS FOR ELECTRONIC LICENSING

BACKGROUND OF THE INVENTION

1. Field of the Invention

This invention relates to the field of electronic licensing.

2. Background Art

In a non-networked environment, licensing of computer software can be accomplished on a user-by-user basis. That is, a license can be based on the number of physical copies of a computer software program (e.g., application, operating system, etc.) purchased by the user.

In a networking environment, one physical copy of a software program can be licensed for use by multiple users. In this case, the number of users, or network connections, is not based on the number of physical copies of a software program. One copy of a software program to execute in a network environment can be licensed for a certain number of users, or connections. Thus, licensing in a non-network environment cannot be used to license software in a network environment.

In a network environment, an existing server contains software (e.g., operating system and application software) that may need to be upgraded. For example, a new version of software may become available. Further, it may become necessary to upgrade the number of connections allowed for a software program.

A previous licensing scheme in a network environment addressed licensing of network software (e.g., server's operating system). This licensing system encrypted a serial number and application number. The encrypted result was placed in a specific location on the network server. Under this scheme, the encrypted serial and application numbers became a permanent part of the server (i.e., are "burned in").

Software distribution using Compact Disc Read-Only Memory (CD ROM) has become increasingly popular because of a CD ROM's capacity and durability. However, if the process of burning in a serial number as described above is used, the CD ROM distribution medium cannot be used because it becomes too expensive. That is, if a serial number is burned into each server, distribution of an upgrade (e.g., version or connection) using CD ROM requires a CD ROM master for every server.

SUMMARY OF THE INVENTION

The present invention allows for the electronic management and enforcement of software licenses. The present invention can be used in a network or non-network environment to facilitate product licensing and upgrades. Further, the present invention accommodates, for example, the use of compact disc read-only memory (CD ROM) product distribution. The present invention provides the ability to distribute electronic copies of a product (e.g., software application) independent of an electronic license that licenses the use of the product. Licensing information includes information regarding a product's features, value, capacity, etc. Further, the present invention can retain useful, after-market information. The present invention provides the ability to implement a license policy. Further, the license policy can be implemented or modified without requiring a new version of the associated product.

The present invention provides the ability to create electronic licenses. Further, the present invention provides the ability to extract and transfer licenses from an inventory of licenses to a final distribution media. Licenses can be transferred to a reseller in batches. A reseller, or software vendor, can employ unused licenses from these batches to generate licenses. An optional companion license can be generated to further protect the distribution and use of licenses. Anchor, upgrade and companion licenses are installed. Installed licenses can be managed and enforced by the present invention. Further, upgrades (e.g., version and connections) can be created and distributed independent of a product.

License documents can be used to retain information related to a license. Portions of a license document can be encrypted using a private key and message digests. The encrypted result can be stored in the license document, and examined to validate a license. License documents can be created in batches. One or more licenses in a batch of licenses can be enabled to create a software license.

BRIEF DESCRIPTION OF THE DRAWINGS

FIG. 2 illustrates a create license process flow.

FIG. 4 illustrates a companion license creation process flow.

FIG. 9B illustrates a process other requests process flow.

DETAILED DESCRIPTION OF THE INVENTION

A method and apparatus for electronic licensing is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

A product manufacturer may want to license the use of its products. For example, a software manufacturer licenses the use of its product. Previously, these licenses have been made an integral part of the product. However, with the present invention, a license (e.g., anchor and upgrade) can be manufactured, extracted, and installed independent of the product. Thus, for example, a product or family of products can be shipped in a form and on a distribution media (e.g., floppy disk, CD-ROM, etc.) independent of the licensing. The licensin can enable, or enhance, the use of one or more of the products shipped. Because licenses are created independent of the product manufacture, additional licenses can, for example, be created for later extraction and installation without shipping another copy of the product.

In a computer network environment, upgrades can be used to modify current licensing terms (e.g., increase capacity or features such as the number of network connections allowed) for a software application. The present invention provides the ability to change licensing terms without shipping another copy of the product, Further, there is no interruption in the execution of the product in its original, or previous, execution state. For example, a purchaser may purchase an initial number of network connections for a network software application. Subsequently, a purchaser may determine that additional connections are needed to support the number of users of the product. To further illustrate, a purchaser can purchase an upgrade license to upgrade the number of allowable connections from five to twenty-five. This purchase does not require that a new copy of the product be shipped to the purchaser. It is only necessary to ship the upgrade license containing the additional connections (i.e., capacity).

Figure 1A:
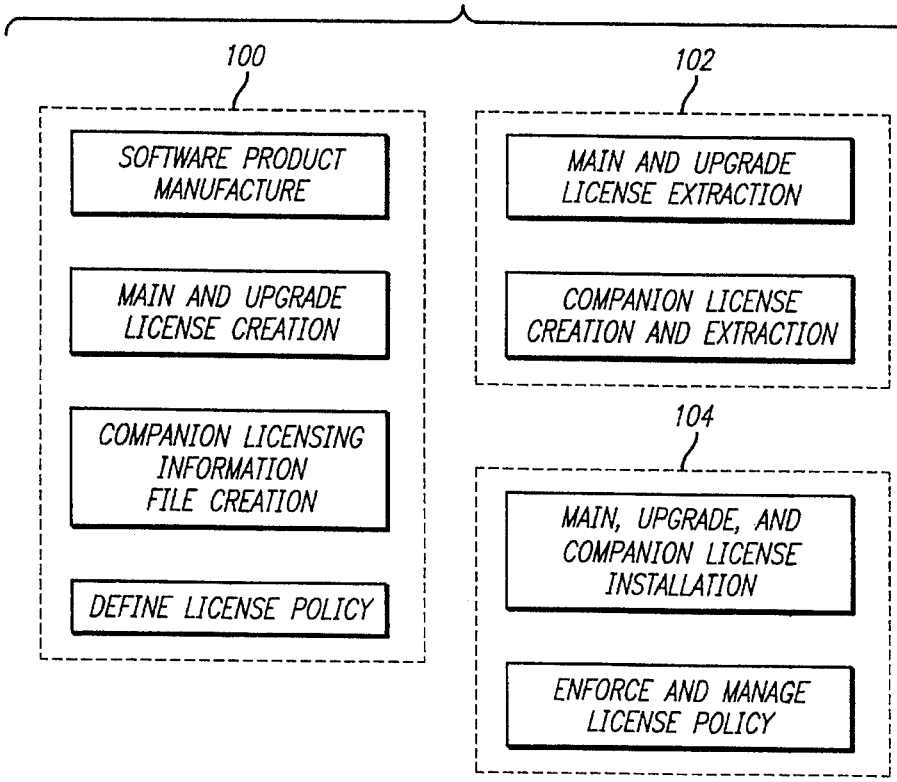
FIGS. 1A and 1C illustrate an overview of licensing using the present invention.
Figure 1B:
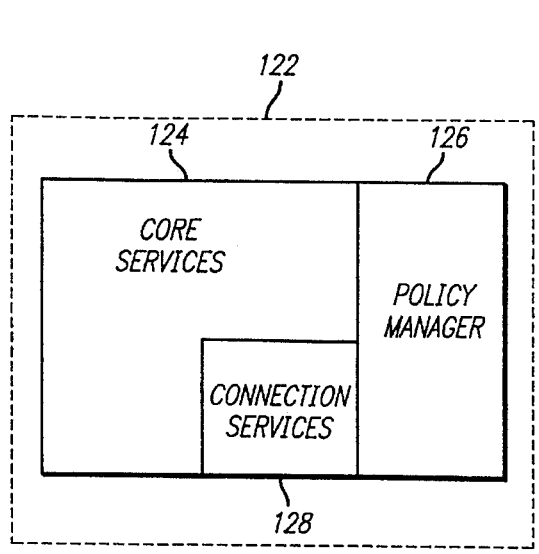
FIG. 1B provides an overview of the components of a network server executing the present invention.
Figure 1C:
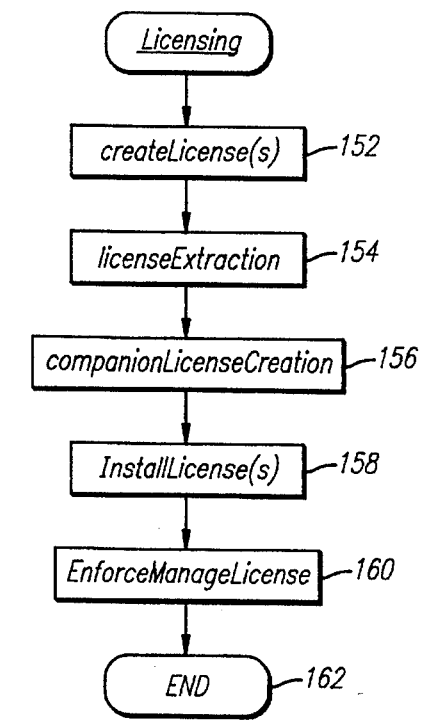

FIGS. 1A & 1C illustrate an overview of the licensing process. At block 100 in FIG. 1A, a product or group of products are manufactured. Further, anchor, or main, and upgrade licenses are created (block 152 in FIG. 1C). These licenses can be enabled to allow use of the product. Anchor and upgrade licenses can have associated, or companion licenses that contain additional licensing information. For example, a companion license can contain reseller information where the manufacturer's product is sold by a reseller to an ultimate purchaser.

The manufacturer can further adopt a flexible licensing policy that can be used to determine licensing issues. For example, in a computer network environment, a purchaser may purchase five network connections for a network software application. The licensing policy may, however, allow two free connections. Thus, the total number of allowed connections is seven.

The product can be distributed in any manner to a reseller or directly to the ultimate purchaser. Licenses created by the manufacturer can be bundled and distributed to a reseller. The reselling function (block 102 in FIG. 1A) can be performed by art entity other than the manufacture or by the manufacturer. In any case, license bundles are stored in a license database. A reseller extracts licenses from a license database (block 154 in FIG. 1C) and transfers the extracted licenses to a purchaser for installation (block 158 in FIG. 1C).

Further, companion licenses containing additional information (e.g., reseller identification, purchaser identification, date of sale) can be created by the reseller (block 156 in FIG. 1C), and transferred to the purchaser. A companion license is needed only when a manufacturer's license requires it. At the purchaser's site (block 104 in FIG. 1A), the extracted licenses can be installed (block 158 in FIG. 1C). Further, access to the product can be enforced and managed according to the licensing policies established by the manufacturer (block 160 in FIG. 1C).

The present invention can be used, for example, by a manufacturer of software applications that are capable of running in a network environment. In this case, licensing includes the product as well as the number of users allowed to use the product. FIG. 1B provides an overview of the components of a network server executing the present invention. The core services of network server 122 are indicated by block 124. Connection services 128 consists of service connection types. Core services 122 and connection services 128 request licenses. Policy Manager 126 satisfies license requests, and enforces and manages a license policy. The policy manager receives requests for information from other components (e.g., connection services). Examples of requests include a request to validate the installed licenses (i.e., anchor, upgrade and companion licenses), or to determine whether a request for a connection can be satisfied given the current number of connections in use. Other services and features can be licensed and managed using this invention.

LICENSE DOCUMENT

Information associated with licenses are contained in license documents. An anchor or main license is the initial license. The initial license acts as a permanent anchor license for a computer system (e.g., network server) on which it is installed. Thus, an anchor license and its associated serial number can be permanently associated with a system. Each license contains a unique identification number that is created when a license is created. The identification number can be displayed on a system console after the license is installed.

An upgrade license can be used to upgrade licensing terms and information (i.e., capacity, features, and value) the number of connections a server can allow, or to upgrade a product version. Upgrade licenses are added in a chain-like fashion after an anchor license.

Licenses can be created in sessions or batches depending on the number of licenses needed for a batch. A batch is a group of licenses (with license information). A batch of licenses may be anchor or upgrade licenses. They are identified by the capacity, feature, and/or value that each license allows. The first part of the license creation process determines the type of license to be created.

License Information Structure

The information associated with a license is stored in a license file. This file can be any type of file (e.g., text file, or an executable file). A license contains encrypted information and clear text. For example, a license can contain 320 bytes with 160 encrypted bytes and 160 bytes of clear text.

Each license can use the same information structure. However, different information items in the structure can be used based on the type of license. For example, an upgrade license can have upgrade identification and Previous Number of Connections information associated with it. In the case of an anchor license, a serial number and number of connections may be associated information.

Companion License

The present invention provides the ability to associate additional licenses with anchor or upgrade licenses. The need for these additional licenses is dictated by the vendor's license and a licensing policy. For example, a reseller companion license can be associated with either an anchor or an upgrade license. A reseller companion license contains information regarding a reseller of a vendor's product. This license can be created at the point-of-sale. Appendix B provides an example of a structure for a companion license.

The companion license can contain dealerId, timeOfPurchase, userName, companyName fields. The dealerId field contains the reseller's identification. The purchasing entity's company name and the contact within the company are contained in the companyName and userName fields. The date and time of purchase can be retained in the timeOfPurchase field. The companion license can further contain a licenseFlags field to supply configuration information specific to the reseller. The serial number and upgrade ID fields provide validation, and contain values consistent with the same fields in the license to which the companion license is associated (e.g., anchor or upgrade licenses).

The license flags can be turned on or off by both the anchor and upgrade licenses. Any license flags turned on by a preceding anchor or upgrade license can be turned off by a subsequent upgrade license. Flags can be set differently from batch to batch. A vendor's policy can dictate how flags are set. Thus, for example, during the creation process, a batch of licenses can be configured to be upgradeable, be used for major accounts, be international, require an anchor assign license, require a serial number link to an anchor license, or turn on or off particular functions and features.

Companion Licensing Information

Companion licensing information is used during companion license creation and installation. Prior to the association of a companion license with another license, companion licensing information is stored in companion licensing information files. In the case of a reseller companion license, a companion licensing information file contains reseller information such as a reseller's unique identifier, a private key (e.g., reseller's password), and the reseller's name.

The private key (i.e., reseller's password) used to create companion licenses is not necessarily the same as the public/private key pair used in the encryption of the anchor and upgrade licenses. The companion licensing information file is encrypted using a password (e.g., a reseller's password) and a secret key encryption algorithm. In the preferred embodiment, the RC2 secret key encryption algorithm is used. However, other encryption algorithms can be used. The companion information licensing file and password are transferred to an entity (e.g., reseller) for use in creating and installing companion licenses.

Companion License Creation

A companion licensing information file can be used to create a companion license. For example, a reselling entity may create a companion reseller license at the time of the sale of anchor or upgrade licenses. The companion licensing information file and password is used with a companion licensing creation process to create a companion license. A companion license can be associated with anchor or upgrade licenses. If a companion license becomes associated with an anchor or upgrade license, it is verified along with its associated license and the other licenses in the license chain when a license validation is performed.

FIG. 4 illustrates a companion license creation process flow. At block 406, the path for generating reseller license(s) is determined. At block 408, a password is requested for use in decrypting the companion licensing information. At block 410, the companion licensing information is obtained from its storage location on a storage media. The password is used to decrypt the companion licensing information at block 412. At decision block 414 (i.e., "main license companion?"), if the companion license is to be associated with an anchor license, the serial number of the anchor license is requested or obtained from storage (if available) at block 416. The serial number is used to link the companion license with the anchor license. Processing continues at block 420.

If, at decision block 414, the companion license is not associated with an anchor license, processing continues at block 418 to obtain an upgrade Id and serial number from the user or from storage (if available). An upgrade license can, therefore, be linked to an anchor license's serial number through a companion license. This linkage provides one scheme for restricting an upgrade license to a specific anchor license and the software system (e.g., server) on which an anchor license is installed. Processing continues at block 420. At block 420, purchaser information is obtained (e.g., contact and company name). After all of this information is obtained, it is stored in the clear text portion of the companion license.

At block 422, the clear text portion of the companion license is message digested using the MD5 message digesting algorithm discussed in association with the anchor and upgrade licenses. Other message digesting algorithms can be used to generate the digest. Further, the companion license's private key is decrypted. The decrypted key is used with a public/private key encryption algorithm to encrypt the message digest and generate a signature. The encryption is placed in the companion license document. At block 424, the companion license is stored on a distribution media (e.g., a license diskette). The distribution media containing the companion license is given to the purchaser to install the licenses (e.g., anchor or upgrade license and the companion license). Processing ends at block 426.

LICENSE CREATION

A license is created independent of the creation of a production version for the license's associated product. Thus, any impact on overall manufacturing process time from license creation is virtually eliminated. An anchor license (e.g., main license) is created as the original license. The anchor license contains a serial number that is used as an anchor to which other licenses can be tied. The anchor license is a permanent license. In a network environment, the anchor license can become a permanent part of a server. The anchor license and the server's serial number can remain with the server for its life.

Additional licenses, upgrade licenses, can be used to modify the licensing terms in the anchor license. For example, a version upgrade can be used to license a new version of a software version licensed by an anchor license. Further, the maximum number of users, or connections, provided in an anchor license can be increased using a connection upgrade license. Similarly, upgrade licenses can be used to upgrade an upgrade license.

Upgrade licenses are added onto existing licenses in a chain-like fashion with the initial licenses in the chain being the anchor license. For example, an anchor license can license version 1.0 of server operating system for five users. A subsequent connection upgrade can increase the maximum number of users to twenty-five. The connection upgrade license is linked to the anchor license. A second upgrade license, a version license, can be used to license a new version of the product. The version license is linked to the connection upgrade license.

As previously indicated, a license document contains license information such as that contained in Appendix A. The type of information retained in a license document can be based on the type of license. For example, an upgrade connection license may contain Upgrade ID and Previous Number of Connections information. An anchor license, for example, may contain Serial Number and Number of Connections information.

Licenses (e.g., anchor, version and connection) can be created in sessions, or batches. A batch is a group of licenses with the same basic information. Licenses can be grouped by a like attribute. For example, a batch may contain twenty-five upgrade licenses with each license allowing a maximum of fifty connections. In this case, each license can be used to upgrade the number of connections provided by an existing license.

Licenses (i.e., batch, single, anchor or upgrade) can be created prior to their use. Newly created licenses are stored in a license extraction database that can be subsequently accessed to extract licenses. Any combination of licenses can comprise the extraction database. A new batch of licenses can be appended to an existing extraction database. A naming convention can be established to facilitate the appending process. For example, a batch of connection upgrade licenses can be contained in a file that has the same name as the connection stratification type for the batch (e.g., a batch of licenses to allow 250 connections are added to a "250.lic" file). A batch can be transmitted to a reseller and added to a reseller's extraction database. Once a license is created, a license can be extracted and enabled at a purchaser's site.

An extraction database can be supplied to an extractor (i.e., a reseller) with the signature for each license encrypted with a password to protect the licenses during transmission to an extractor. The password can be later used to decrypt the secret key encryption of the private key used to create each unique license signature.

FIG. 2 illustrates a create license process flow. At block 202, creator-specified licensing information is obtained. This information can be obtained interactively using panels. For example, one or more panels can be used to display default licensing information or blank fields that are modifiable. Referring to Appendix A, License Flags, Extractor's ID are examples of such information.

Where a batch of licenses are being created, these panels can further be used to obtain information for the batch. For example, one or more panels can be used to identify the number of licenses to be included in the batch, the starting serial number (i.e., for a batch of anchor licenses), the starting Upgrade ID and previous number of connections that each license in the batch allows, and the values of the flags fields. This information can be stored for future use, or used to recover information related to the current creation session in case the session is abnormally terminated prior to completion.

At processing block 204, the information obtained from the operator is placed in the clear text portion of the license. At processing block 206, the license signature is created by generating a message digest (using a message digest algorithm) of the clear text. The message digest is encrypted using a decrypted private key. The encrypted result is copied into a signature area of the license document.

Message digesting is a scheme to provide data integrity and detect errors. An algorithm for generating a message digest is designed to produce an unique output (i.e., a message digest) for any given input. There are a number of message digesting algorithms available for use such as the MD2, MD4 or MD5 algorithms provided by Rivest, Shamir, and Associates (RSA). In the preferred embodiment, the clear text portion of a license is message digested using RSA's MD5 algorithm. However, any other method for generating a message digest can be used. The message digest is then encrypted with a private key.

As each license is created, the license can be encrypted again to disable the license for distribution to the extracting agent. Thus, the license is useless until it is enabled by decrypting this second encryption. For example, in processing block 208, the signature area is encrypted with an extractor's password using an RC2 secret key encryption algorithm.

At block 210, the newly created license is appended to the end of an extraction inventory database file. At decision block 212 ("i.e., create additional licenses?") if more licenses are to be created, processing continues at processing block 204 to generate additional licenses using a next license ID number. If, at decision block 212, all of the licenses have been generated, processing continues at block 214 to transfer the license extraction inventory database file to a distribution media (e.g., floppy disk, CD ROM, or tape).

At decision block 216 (i.e., "multiple stratification files?"), if additional license extraction inventory database files are to be transferred to this distribution media, processing continues at block 214 to transfer any additional extraction files. If not, processing continues at block 218 to ship the distribution media to the extractor (e.g., reseller). At block 220, the creation process ends.

Alternatively, the creation process can be modified to generate one or more upgrade licenses that may be linked to specific anchor licenses. Thus, an upgrade license can be restricted to upgrading a particular anchor license. In this case, upgrade licenses can be redone with specific serial number links to a given anchor license for which the upgrades can only be used.

LICENSE EXTRACTION

After an extractor receives a distribution media containing an inventory of licenses, an extractor can add the new inventory of licenses to any existing license inventory database. The resulting inventory database can, therefore, contain any number of extraction inventory files. Licenses in the inventory database can be extracted, using a first-in, first-out method. Extracted licenses can be copied to a final distribution media. Additionally, a count of the remaining inventory can be displayed along with a display of the contents of each license in each inventory file.

Figure 3:
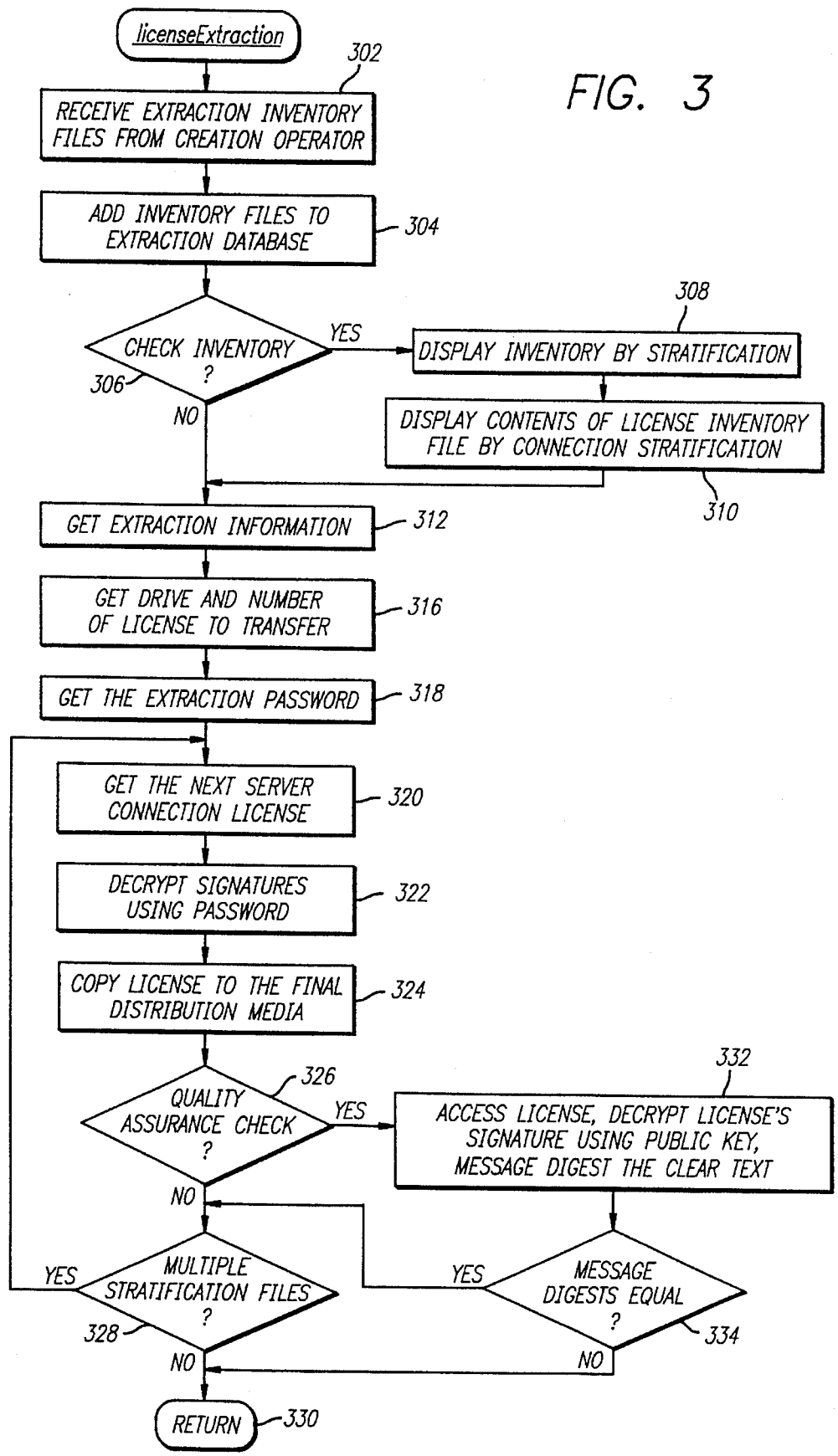
FIG. 3 illustrates a license extraction process flow.

FIG. 3 illustrates a license extraction process flow. At processing block 302, any new extraction inventory files can be obtained from the creator of the licenses. This can be obtained, for example, as illustrated in the create license process in FIG. 2. The newly-created extraction inventory files can be transferred to an extractor via a distribution media. Referring to FIG. 3, at block 304, the newly-created extraction inventory files are added to the extraction database.

At decision block 306 (i.e., "check inventory?"), if an inventory check is requested, processing continues at block 308 to display inventory by stratification (e.g., grouping by maximum connections allowed). Further, at processing block 310, the contents of each license inventory file can be displayed by, for example, connection stratification. Processing continues at block 312. If, at decision block 306, an inventory check is not requested, processing continues at block 312.

At processing block 312, extraction information is obtained from the extractor. For example, the license group (i.e., batch) from which a license is to be obtained can be identified by the extractor. Further, the extractor may indicate whether a quality assurance test is to be performed on the license after its transfer to the final distribution media. At processing block 316, a final distribution media pathway and the number of sets of licenses to extract are be defined. At processing block 318, an extractor's extraction password is obtained. The extractor's password is used to decrypt a license in the extraction inventory. The password can be used to secret-key decrypt a license signature into its usable state.

At processing block 320, the next license is obtained. At processing block 322, the license's signature is decrypted using the extractor's password. The license is copied to the final distribution media at processing block 324. If, at decision block 326 (i.e., "quality assurance check?"), it is determined that the quality assurance option was selected, the license is read back, the signature is decrypted using the public key, and the clear text information is message digested at processing block 332. At decision block 334 (i.e., "message digests equal?"), the two message digests are compared. If the two digests do not match, the licensing process is terminated at block 330. If the two digests match, processing continues at decision block 328.

If, at decision block 328 (i.e., "multiple stratification files?"), it is determined that additional licenses are to be extracted, processing continues at block 320 to extract and transfer the remaining licenses. When all licenses are processed, processing ends at block 330.

LICENSE INSTALLATION

License installation installs a license, and if required, a companion license from distribution media to a secure directory in a computer system (e.g., a network server). The anchor license file copied to the secure directory is given a "0.000" file extension to indicate that it is the first license in the chain. As each subsequent upgrade license is added, the file extension name is incremented by one. This can be used to determine a sequential order for validating a chain of licenses. A companion license is given the same extension as its associated anchor or upgrade license. The secure directory is accessible by a limited number of processes. Prior to copying a license document to the secure directory, the installation process validates linking information. The validity of the new license is verified by a policy manager after it is copied to the secure directory. If it is invalid, it is removed. If an invalid license has an associated companion license, the companion license is removed.

If the license being installed is an anchor license, the license's flags can be examined to determine whether a companion license is required. If a companion license is required, the serial number contained in the companion license is compared to the anchor license's serial number. If the two serial numbers do not match, the anchor and companion licenses are not installed.

If the license being installed is an upgrade license, the license flags can be examined to determine whether a companion license is required. If a companion license is required, the upgraded value in the companion license is compared to the same field's value in the upgrade license. Further, the serial number contained in the companion license is compared to the anchor license's serial number. If the upgraded and serial number values do not match, the upgrade and companion licenses are not installed. Further, if an upgrade license is being installed, the upgrade license's maximum connection link to the current maximum connections in the current licensing information must be equal. If they are not equal, the upgrade license is not installed.

Figure 5A:
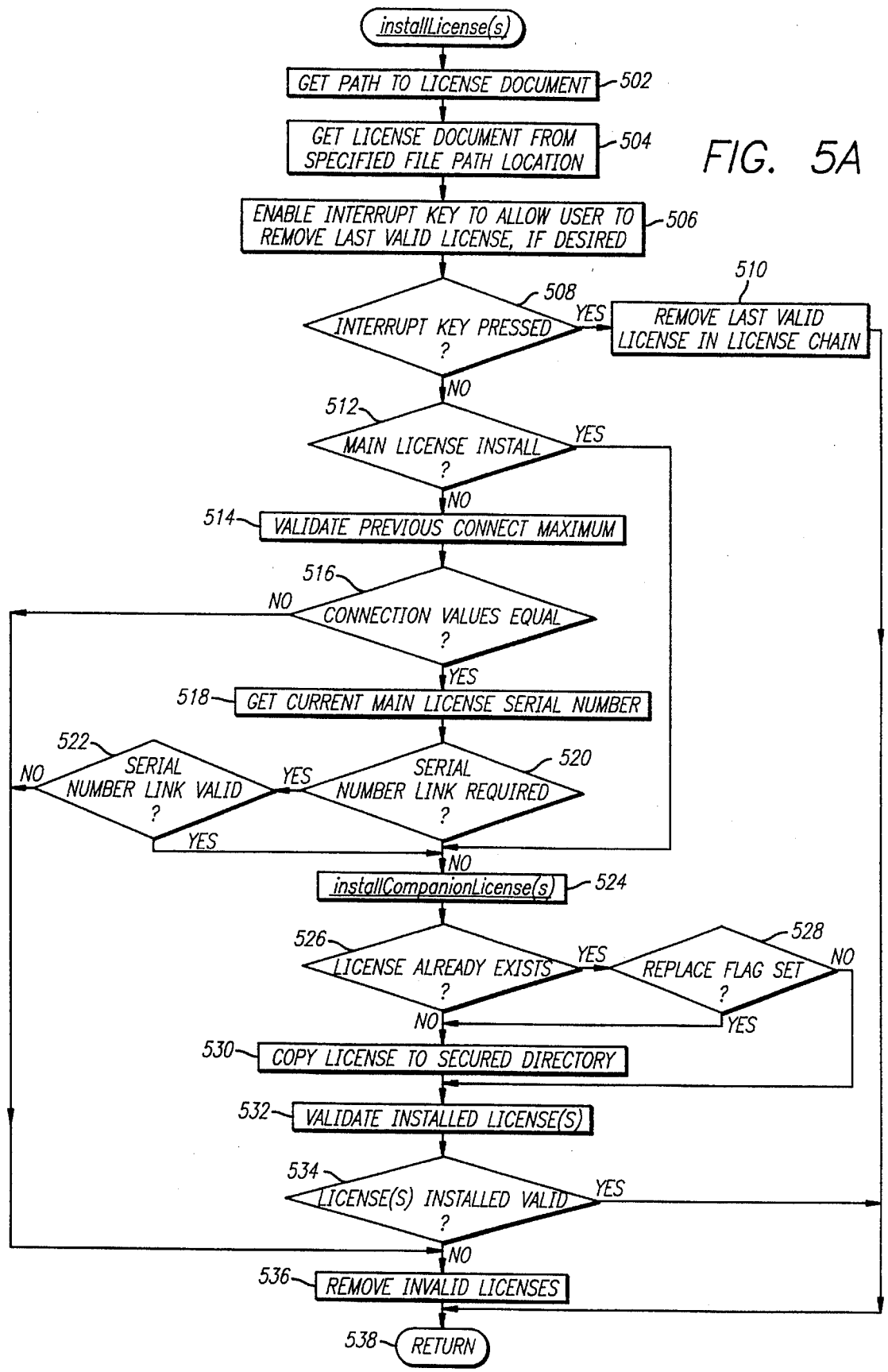
FIG. 5A illustrates a process for installing licenses.

As indicated, if any of these tests fail, the license(s) being installed are not installed (i.e., removed). The validated license currently being used and stored in memory is used. FIG. 5A illustrates a process for installing licenses. At block 502, the path to the license document is determined. At block 504, the license document is obtained from the specified location.

The installation process provides the ability to remove a license that may, for example, have been inadvertently copied to more than one system. The present invention provides this capability by supplying a "hot key" that, when pressed, indicates that the last valid license is to be removed from the chain of valid license. At block 506, the "hot key" is enabled.

At decision block 508 (i.e., "interrupt key pressed?"), if the "hot key" is pressed, processing continues at block 510 to remove the last valid license in the license chain. That is, the last valid license in the chain of licenses is identified, the license is removed from the chain, and the linkages are modified to reflect the removal. Further, the policy manager performs validation on the modified license chain, and the maximum connections allowed is updated. Processing returns at block 538.

If the "hot key" is not detected, processing continues at decision block 512. At decision block 512 (i.e., "main license install?"), if the license being installed is an anchor license, processing continues at block 524. If the license to be installed is not an anchor license, processing continues at block 514 to validate the upgrade license's maximum connection link against the current maximum connections in the current licensing information.

At decision block 516, the upgrade license's previous maximum connections field is compared to the current maximum connections. If they are not equal, processing continues at block 536 to remove the invalid license(s). If they are equal, processing continues at block 518 to get the serial number of the current anchor license. At decision block 520 (i.e., "serial number link required?"), if a comparison of the serial numbers associated with the anchor and the new license is required, processing continues at decision block 522.

At decision block 522 (i.e., "serial number link valid?"), if the new license's serial number is not equal to the anchor license's serial number, processing continues at block 536 to remove the invalid license(s). If they are equal, processing continues at block 524 to invoke installCompanionLicense(s) to install a companion licenses of the new license. At decision block 526 (i.e., "license already exists?"), if the new license does not exist, processing continues at block 530 to copy the license to a secure directory.

If, at decision block 526, it is determined that the new license already exists, processing continues at decision block 528. At decision block 528 (i.e., "replace flag set?"), if the replace flag indicates that a replacement license is to be installed, processing continues at block 530 to copy the new license to a secure directory, and processing continues at block 532. If, at decision block 528, it is determined that the replace flag is not set, processing continues at block 532.

At block 532, the policy manager is invoked to validate the installed license(s). At decision block 534 (i.e., "license(s) installed valid?"), if the installed licenses are valid, processing returns at block 538. If the installed licenses are invalid, processing continues at block 536 to remove the invalid licenses (e.g., anchor, upgrade, or companion). Processing returns at block 538.

Companion License Installation

Figure 5B:
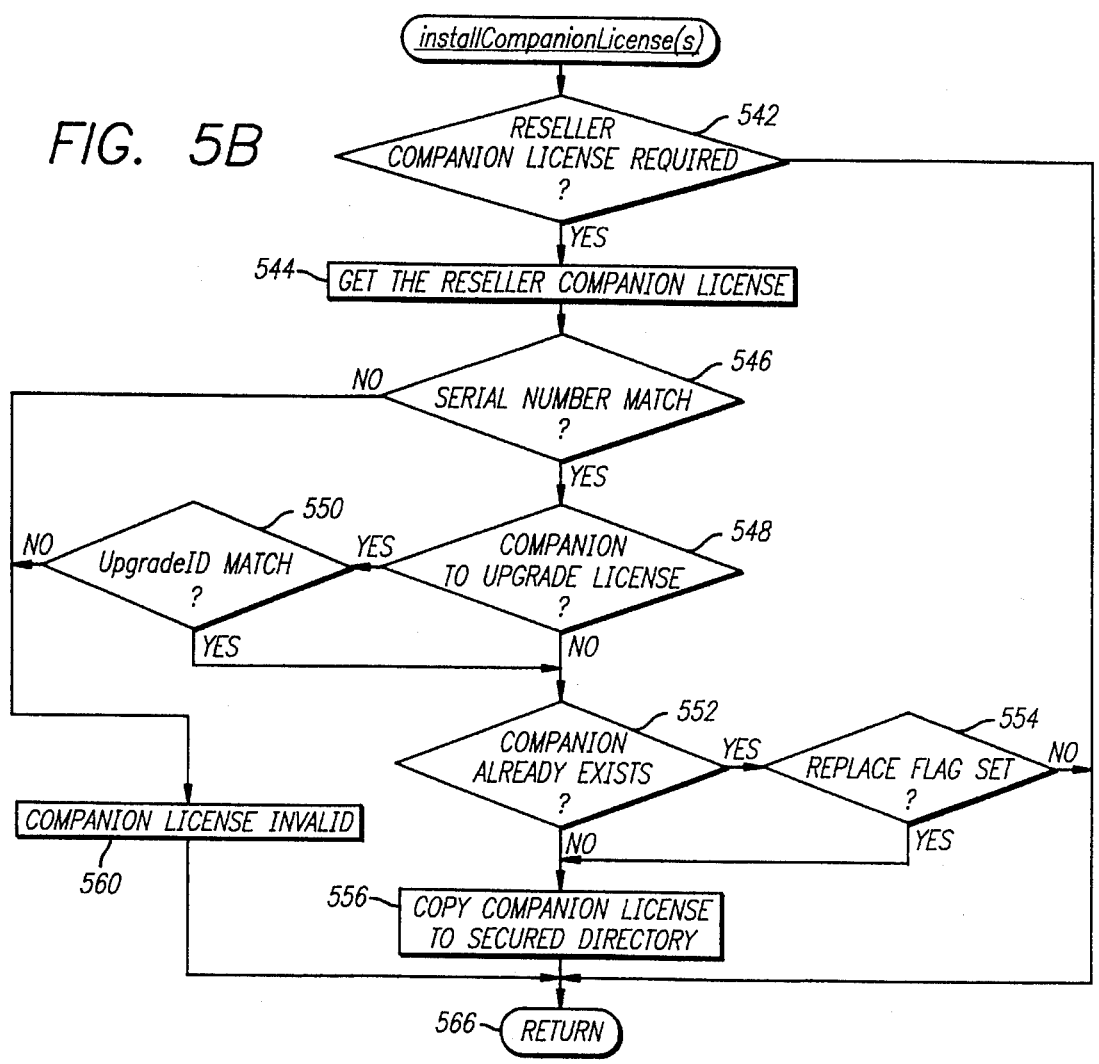
FIG. 5B provides an illustration of a install companion license(s) process flow.

During the installation of an anchor or upgrade license, companion licenses can be installed. FIG. 5B provides an illustration of a installCompanionLicense(s) process flow. At decision block 542 (i.e., "companion license required?"), if the newly-installed license's flags do not indicate a requirement for a companion license, processing returns at block 566.

If, at decision block 542, a companion license is indicated, processing continues at processing block 544 to get the companion license. At decision block 546 (i.e., "serial number match?"), the companion license's serial number is not equal to the anchor license's serial number, processing continues at block 560 to mark the companion license as invalid, and processing returns at block 566. If, at decision block 546, the serial numbers are determined to match, processing continues at decision block 548.

At decision block 548 (i.e., "companion to upgrade license?"), if the companion license is not associated with an upgrade license, processing continues at decision block 552. If it is, processing continues at decision block 550. At decision block 550 (i.e., "upgraded match?"), if the upgraded values for companion and upgrade licenses are not equal, processing continues at block 560 to mark the companion license invalid, and processing returns at block 566. If the upgraded values match, processing continues at decision block 552.

At decision block 552 (i.e., "companion already exists?"), if the companion license does not exist, processing continues at block 556 to copy the companion license to a secure directory. Processing returns at block 566. If the companion license already exists, processing continues at decision block 554. At decision block 554 (i.e., "replace flag set?"), if the replace flag indicates that a replacement companion license is to be created, processing continues at block 556 to copy the companion license to a secure directory. Processing returns at block 566. If, at decision block 554, it is determined that the replace flag is not set, processing returns at block 566.

POLICY MANAGER

A process known as a policy manager validates and manages licenses. It can implement the validation and management of licenses in accordance with a current license policy. For example, a current policy may allow a number of free server connections. In this case, the policy manager can include the free server connections in the total number of allowed connections. That is, the policy manager can monitor the number of connection licenses previously granted, and determine which license grants count toward the maximum number of allowed licenses.

In addition to implementing license policies, the policy manager can display key license information, respond to information requests (e.g., from the operating system), maintain a valid license identifier table, supply valid license identifier information to a watchdog routine, and validate license identifiers.

License validation can be performed on all licenses in the installed license chain (i.e., of anchor, upgrade, and companion licenses). License validation can be triggered as a result of some event. For example, validation can be done when the upper limit of the maximum connections is reached, a console command is detected, software installation, random initiation, or when a violation (e.g., licensing) is detected.

Typically, the validation process is performed on licenses in the order in which they were installed in the licensing directory. Information from each valid license is added to a license information store in memory. To provide additional security, the licensing directory can be located in a secure directory f:hat has limited (e.g., ring zero) access. Each time a validation is performed, all licenses in the chain are validated (e.g., contents and linkages within the chain are validated).

Validation can further include a comparison of a license's decrypted signature (i.e., a message digest) with the message digest of its clear text information. Further, validation can verify version number (i.e., product and license versions), productID string, serial number link, upgrade ID link, and previous maximum connection link. If valid, the license version, major and minor product version numbers, and product ID string for the current Policy Manager are validated.

When a companion license is required and an anchor license is the only license in the chain, the serial number in the anchor license must match the serial number contained in the companion license. When a companion license is required and an upgrade license exists, the anchor license's serial number must match the companion license's serial number. Further, the companion license's upgradeID must match the same field in the Upgrade license.

Further, the maximum connection associated with each license is examined relative to previous licenses. When an upgrade license in the license chain is being validated, its previous number of maximum connections field in the license is validated against the current number of maximum connections field in the master license stored in memory (i.e., the valid maximum connections allowed by the last upgrade license). If a subsequent connections upgrade license's previous maximum connections is not equal to the new maximum number of connections for its preceding connections upgrade license, the subsequent connections upgrade license is invalid.

Thus, a linkage order for each license in the chain is examined to verify that a license's previous maximum connections matches the current maximum connections allowed by the last valid license in the chain. For example, if the previous license in the chain authorizes a maximum of five connections and the next license (i.e., an upgrade to the previous license) authorizes twenty-five to fifty connections, a gap exists. In this case, the previous chain of linkages does not contain authorization for twenty-five connections. Therefore, the chain's linkage is incomplete. The license that authorizes the twenty-five to fifty connections is invalid.

After an anchor license is determined to be valid, the anchor license can be copied into memory for later reference. When an upgrade license is valid, portions of the upgrade license can be copied over portions of the anchor license information stored in memory. For example, the new maximum connections, manufacture ID, site ID, license flags, and the upgrade ID from the upgrade license can be used to upgrade license information retained in memory. The upgrade ID is further copied into a table of License IDs.

When an anchor license is determined to be invalid, the number of maximum connections can be reduced to one by the policy manager and an error message placed in a system error log and displayed on a system console. Thus, no additional connection licenses are granted. However, existing connections can remain uninterrupted and connected. Because the maximum number of connections allows one connection, a connection (e.g., remote user connection) can be made to install valid licensing, or repair the existing licenses. The allowed connection can be further limited to a privileged user (i.e., a user that possesses privileged connection rights.)

Further, a maximum connection of one results in the initiation of another validation each time a connection request is received. Thus, when a subsequent connection request is detected, a validation can be initiated to determine whether the licensing documents have been restored to a valid state. When the licensing documents are returned to a valid state, the policy manager can grant connection licenses to the extent of the maximum number of connections indicated by the validated license document in memory.

The policy manager can remove duplicate licenses. The license chain is updated to reflect the removal of the duplicate license(s). The maximum connections allowed can be modified to reflect the last valid license. A non-duplicate, valid license can be added to the chain to restore the maximum connections allowed by the chain when a duplicate license was removed from the middle of the license chain.

ENFORCE AND MANAGE LICENSES

Figure 6:
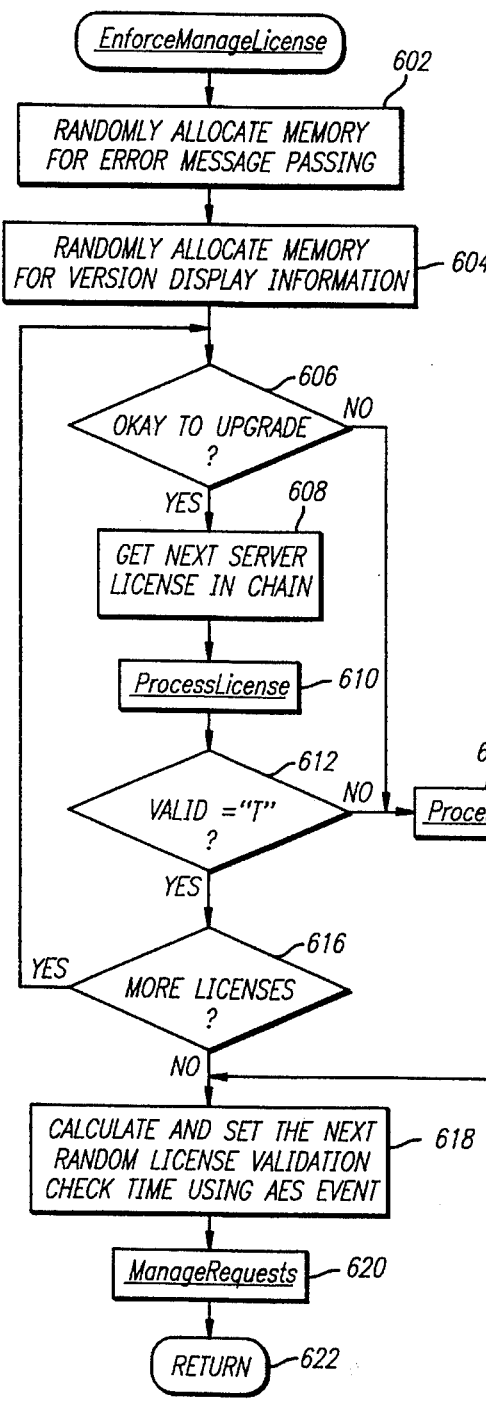
FIG. 6 provides an example of an enforce and manage license policy process flow.

These license enforcement and management capabilities of the policy manager execute while a computer system (e.g., network server) is operational. FIG. 6 provides an example of an EnforceManageLicense process flow. At processing block 602, memory is allocated to transmit error messages. At processing block 604, memory is allocated to store version display information. At decision block 606 (i.e., "okay to upgrade?"), if an upgrade is valid, processing continues at block 614 to invoke ProcessError, and processing continues at block 618.

If the upgrade is valid, processing continues at decision block 616. At decision block 616 (i.e., "more licenses?"), if there are more licenses, processing continues at decision block 606. If not, processing continues at block 618 to calculate and set the next random license validation check time using an asynchronous event scheduler (AES). At block 620, ManageRequests is invoked. Processing ends at block 622.

ProcessLicense

Figure 7B:
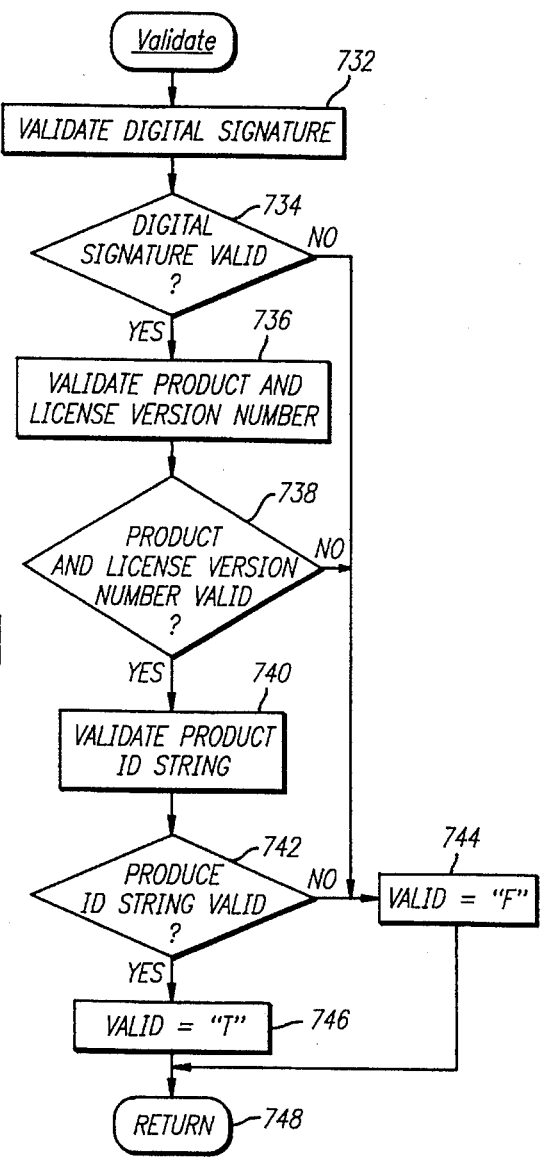
FIG. 7B illustrates a validate license process flow.
Figure 7A:
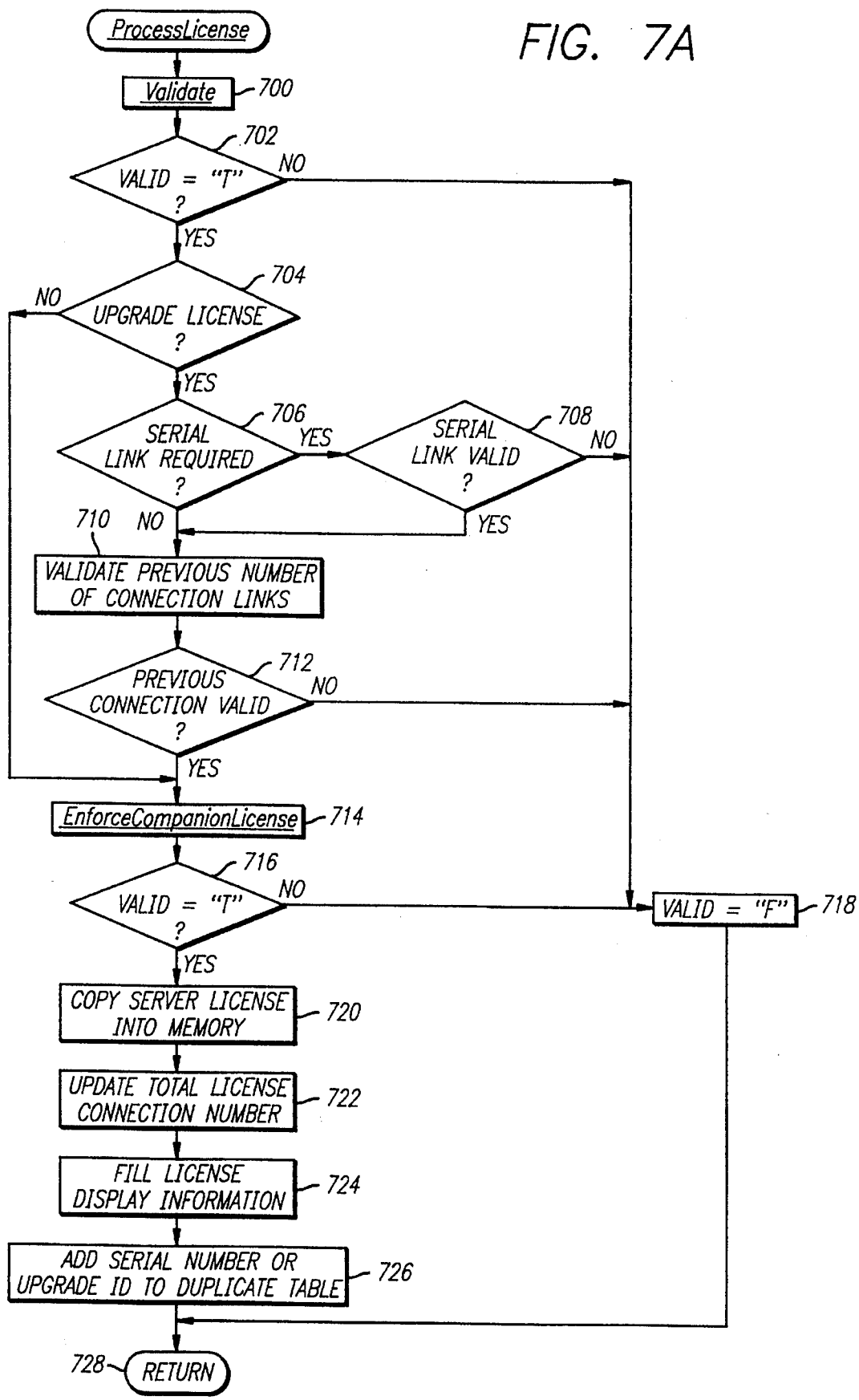
FIG. 7A provides a process license process flow.

Each license in the license chain is validated by the policy manager at various times. For example, validation can occur when the policy manger is invoked or when a new license is being added to the license chain. FIG. 7A provides a ProcessLicense process flow. At block 700, Validate is invoked. At decision block 702 (i.e., "valid='T'?"), if a license is determined to be invalid, processing continues at block 718 to mark the license as invalid. Processing returns at block 728.

If the license is determined to be valid, processing continues at decision block 704 (i.e., "upgrade license?"), if the license is not an upgrade license, processing continues at block 714. If the license is an upgrade license, processing continues at decision block 706. At decision block 706 (i.e., "serial link required?"), if a serial number link between the anchor and upgrade licenses is not required, processing continues at block 710. If the link is required, processing continues at decision block 708. At decision block 708 (i.e., "serial link valid?"), the serial number of the anchor license is compared with the serial number associated with the upgrade license. If they are not equal, processing continues at block 718 to mark the license as invalid, and processing returns at block 728.

If the two serial number values are determined to be equal at decision block 708, processing continues at block 710. At block 710, the previous number of connections allowable is validated. That is, the previous maximum number of connections value in the new upgrade license is compared to the current number of connections value of the previous upgrade license. At decision block 712 (i.e., "previous connections valid?"), if these two connections values are not equal, processing continues at block 718 to mark the license invalid, and processing returns at block 728. If they are equal, processing continues at block 714 to invoke EnforceCompanionLicense.

At decision block 714 (i.e., "valid ='T'?"), if the companion license is determined to be invalid by EnforceCompanionLicense, processing continues at block 718 to mark the companion and associated licenses as invalid and processing returns at block 728. If the companion license is determined to be valid at decision block 716, processing continues at block 720. At block 720, the license is copied into memory. At block 722, the total number of connections is updated. At block 724, license information is retained for display. At block 726, the serial number (if an anchor license was installed) or upgraded (if an upgrade license was installed) is added to a duplication check table that is used to detect duplicate licensing across network servers.

If an error occurs during the validation process, an AES event is scheduled to display error information and create error log entries. If license document files associated with any invalid licenses are copied into the secure directory, they are removed. Further, the number of allowable connections is set to the value of the last valid server.

License Validation

Each license in a license chain can be validated by the policy manger in response to an AES event, or some other event. FIG. 7B illustrates a Validate process flow. At block 732, the license's digital signature is validated. That is, that the clear text content in the license document, when message digested, matches the decrypted message digest in the license document. At decision block 734 (i.e., "digital signature valid?"), if the two message digests are not equal, processing continues at block 744 to mark the license invalid, and processing returns at block 748.

If the two message digests are determined to be equal at decision block 734, processing continues at block 736. At block 736, the product and license version numbers are validated. At decision block 738 (i.e., "product and license version number valid?"), if the product and license version numbers are invalid, processing continues at block 744 to mark the license invalid, and processing returns at block 748. If the product and license version numbers are valid, processing continues at block 740 to validate the productId string. At decision block 742 (i.e., "product ID string valid?"), if the productId string is invalid, processing continues at block 744 to mark the license invalid, and processing returns at block 748. If the productId string is valid, processing continues at block 746 to mark the license as valid, and processing returns at block 748.

Enforce Companion License

Figure 7C:
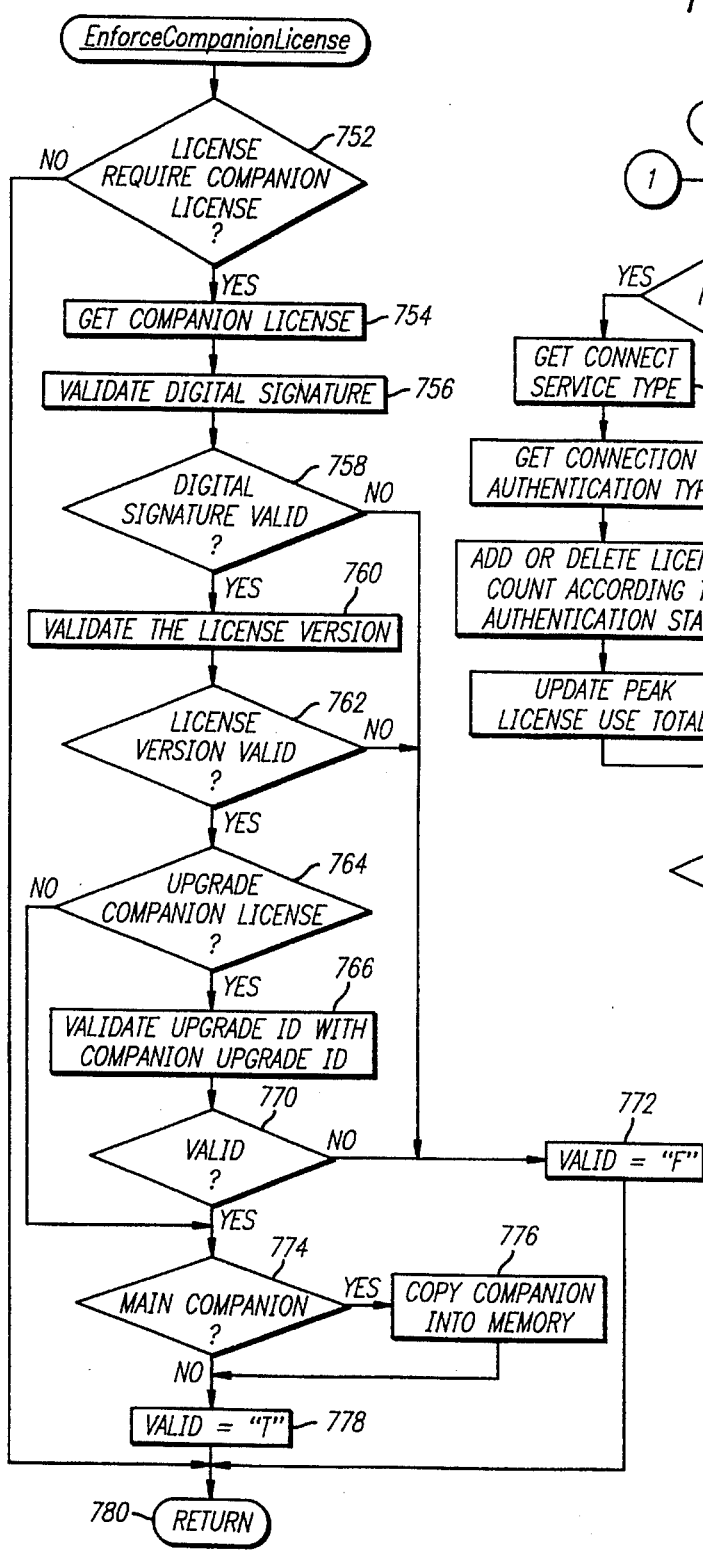
FIG. 7C illustrates an enforce companion license process flow.

The validation process includes any companion licenses to licenses in the license chain. FIG. 7C illustrates an EnforceCompanionLicense process flow. At decision block 752 (i.e., "license requires Companion License?"), if a companion license is not associated with the license (e.g., anchor or upgrade) currently being validated, processing returns at block 780. If there is a companion license, processing continues at block 754 to obtain the companion license. At block 756, the companion license's digital signature is validated. At decision block 758 (i.e., "digital signature valid?"), if the digital signature is determined to be invalid, processing continues at block 772 to mark the companion license invalid, and processing returns at block 780.

If the digital signature is determined to be valid, processing continues at block 760. At block 760, the license format version is validated. At decision block 762 (i.e., "license version valid?"), if the license format version is invalid, processing continues at block 772 to mark the companion license invalid, and processing returns at block 780.

If, at decision block 762, the license format version is valid, processing continues at decision block 764. At decision block 764 (i.e., "upgrade companion license?"), if the companion license is not associated with an upgrade license, processing continues at decision block 774. If the companion license is associated with an upgrade license, processing continues at block 766 to compare the upgraded values from the upgrade and companion licenses. At decision block 770 (i.e., "valid?"), if the upgradeId values are not equal, processing continues at block 772 to mark the companion license invalid, and processing returns at block 780. If the upgradeId value are equal, processing continues at decision block 774.

At decision block 774 (i.e., "main companion?"), of the companion license is not associated with an anchor license, processing continues at block 778. If the companion license is associated with an anchor license, processing continues at block 776 to store the companion license in memory for later extraction. Processing continues at block 778. At block 778, the companion license is marked valid. Processing returns at block 780.

Process Errors

Figure 8:
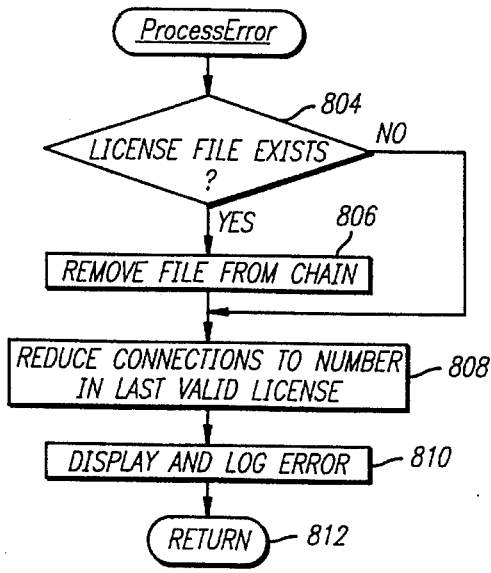
FIG. 8 illustrates a process error process flow.

When a license is determined to be invalid, it is removed from the license chain, and the number of allowable connections is modified to reflect the removal. For example, if a newly-installed upgrade license that upgrades the number of connections from five to twenty-five is determined to be invalid, it is removed from the chain. Further, the number of allowable connections is set to five. FIG. 8 illustrates a ProcessError process flow.

At decision block 804 (i.e., "license file exists?"), if the invalid license does not exist (i.e., was not installed in the secure directory and license chain), processing continues at block 808. If the invalid license was installed in the secure directory and license chain, the file is removed from the secure directory and license chain at block 806. Processing continues at block 808.

At block 808, the number of allowable connections is set to the maximum number of connections allowed by the last valid license. At block 810, error messages can be written to a display and error log. Processing returns at block 812.

Manage Requests

Figure 9A:
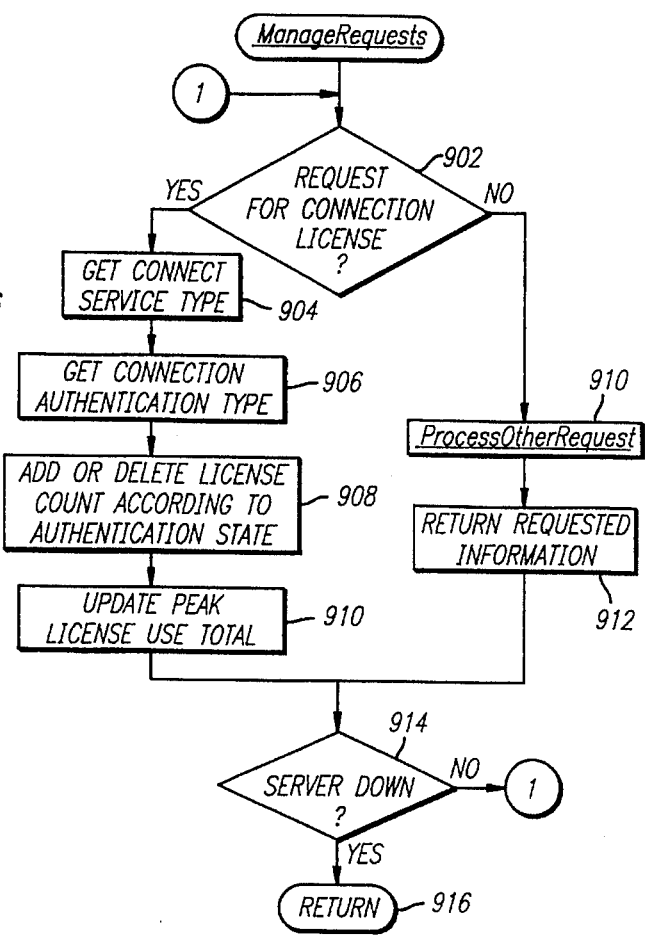
FIG. 9A illustrates a manage requests process flow to manage these policy manager requests.

The policy manager satisfies other tasks in addition to validation. The policy manager waits for a request from another process or entity. For example, when a connection request is received from the connection service, the policy manager can grant or release licenses in rite license pool (i.e., the total number of allowable connections). Other requests are satisfied by the policy manager such as providing license information and checking for duplicate license numbers. FIG. 9A illustrates a ManageRequests process flow to manage these policy manager requests.

At decision block 902 (i.e., "request for connection license?"), if the request is not a request involving a connection license, processing continues at block 910 to invoke ProcessOtherRequest to process other requests such as providing license information and checking for duplicate license numbers. Processing continues at block 912 to provide the requested information. Processing continues at decision block 914. If, at decision block 902, the request involves a connection license, processing continues at block 904. At block 904, a connection service type is obtained. At block 906, a connection authentication type is obtained.

To process a request for a connection license, the policy manager uses information such as a connection number, object identification, connection service type, current authentication state, requested authentication state, and duplicate flag. The connection number provides an identification of the connection that is requesting a connection license. The object identification identifies the object requesting the connection license. The connection service type indicates the type of connection service for which the connection license is requested.

The current authentication state indicates the authentication state of the connection. Examples of authentication states are permanent and non-permanent. Examples of non-permanent licenses are: not authenticated, not connected, internal, and temporary. The requested authentication state indicates the authentication state needed by the connection. Further, the requested authentication state is used to determine whether a connection license is released or granted. The duplicate flag indicates that the request is for a connection type that already has a license and does not require another connection license.

If a license is required, the current connection authentication state is evaluated. If, for example, the current authentication state is "permanent" and the requested state is "temporary," a license is released by decrementing a counter that indicates the total number of licenses currently in use. If the current state is "temporary" and the requested state is "permanent," a license is used and the "in use" counter is incremented by one. The following table illustrates these and other circumstances, and the effect on the license pool:

| Current State | Requested State | Effect on License Pool |
| --- | --- | --- |
| Permanent | Permanent | No change |
| Non-permanent | Permanent | Pool decreased by one |
| Permanent | Non-Permanent | Pool increased by one |
| Non-Permanent | Not Authenticated | No change |
| Non-Permanent | Not Connected | No change |
| Non-Permanent | Internal | No change |
| Non-Permanent | Temporary | No change |

Referring to FIG. 9A, the policy manager evaluates the connection service type and connection authentication type to determine, according to a license policy, whether a requesting connection service type requires a license from the connection license pool. Thus, at block 908, the "in-use" counter is incremented or decremented by one based on the connection service type and the connection authentication type. At block 910, the peak license rise total is updated. Processing continues at decision block 914.

Because the policy manager enforces and manages the access to the software applications executing on a computer system (e.g., network server), the policy manager must execute while the computer system is available. Decision block 914 illustrates this notion. If the computer system for which the policy manager is providing its enforcement and management capabilities is not operational, the policy manager ends at block 916. Otherwise, the policy manager continues processing at decision block 902.

Process Other Requests

The remaining requests processed by the policy manager are addressed by FIG. 9B. FIG. 9B illustrates a ProcessOtherRequest process flow. At decision block 922 (i.e., "request for display license information?"), a request for license information for display is processed by block 924, and processing returns at block 964. At decision block 926 (i.e., "get main license serial number?"), a request for an anchor license serial number is processed by block 928, and processing returns at block 964.

At decision block 930 (i.e., "get license application number?"), a request for the extended ID for an anchor license is processed by block 932, and processing returns at block 964. At decision block 934 (i.e., "request for total allowable connection licenses?"), a request for the total number of connection licenses available for a server system is processed by block 936, and processing returns at block 964. At decision block 938 (i.e., "request for in-use licenses?"), a request for the total number of connection licenses that are currently being used by the server system is processed by block 940, and processing returns at block 964.

At decision block 942 (i.e., "license flags?"), a request for license flag settings that reflect the last, valid upgrade license is processed by block 944, and processing returns at block 964. At decision block 946 (i.e., "request for site ID string?"), a request for the site identification string for the major account to whom the license was sold is processed by block 948, and processing returns at block 964. At decision block 950 (i.e., "request for next. license ID number?"), a request for the next license identification number from the server system's license ID table is processed by block 952, and processing returns at block 964.

At decision block 954 (i.e., "request for copyright license check?"), a request for a determination of whether a license identification is a duplicate of another license is processed by block 956, and processing returns at block 964. At decision block 958 (i.e., "request for peak license use information?"), a request for peak connection license use during a system's current length of operation is processed by block 960, and processing returns at block 964. If, at decision block 958, if the request is an unknown request, processing continues at block 962 to generate an error message, and processing returns at block 964.

PUBLIC/PRIVATE KEY PAIRS

A public/private key pair can be created for anchor, upgrade, or reseller licenses. One key pair can be created for anchor and upgrade licenses. Another key pair for reseller licenses. The process of creating the key pair consists of multiple steps. Initially, a public/private pair is built. Then, the private key is secret key encrypted using a password. The public key is placed in a header file and used by the processes designed to perform quality assurance checks as licenses are created, or used by the policy manager to decrypt license signatures.

Thus, a method and apparatus for electronic licensing has been provided.

APPENDIX A

| | |
|---|---|
| License File Stamp | License information identifying string. Uses "MLS" to identify that the license in the file is a manufacturer type of license |
| Product ID String | Identifies the connection-oriented server product for which the license is valid |
| ManufacturerID | Extractor (OEM or manufacturer) Identification. Identifies extractor for which the license was created |
| Major Product Version | Major version number for a server product. |
| Minor Product Version | Minor version number for a server product. |
| License Version | The version of the license format. |
| SiteID | The identification of a special entity that is using the license. |
| License Flags | These are bit settings that indicate the following status: |
| Major account license | Indicates the license is a major account customer. |
| Vendor site license | Indicates the license is a vendor's site license and may only be used in-house or by vendor's employees. |
| International license | Indicates that the license is for servers in the international markets. |
| Anchor Assign Required | Indicates that a Reseller companion add-on license is required to accompany this license. |

APPENDIX A -continued

| | |
|---|---|
| Serial Number Link Required | Indicates that any upgrade licenses must be serialized to the serial number in the Main license for which it is an upgrade. |
| Runtime flag | Indicates that the license is a runtime only license allowing typically only one bona fide connection to the server on which the license is used. |
| Non-upgradeable | Indicates whether license is connection or version upgradeable. |
| Vendor test flag | License for specialized use (e.g., vendor's in-house development or testing use only. |
| Time Of Creation | License creation time. |
| Number Of Connections | Total number of connections allowed by this server license. |
| Previous Number of Connections | Previous number of total connections. Can be used to validate a connection upgrade (i.e., to identify any skipped connection upgrades). |
| Serial Number | Identification number for the license and server. Zero for upgrade licenses. |
| Upgrade ID | Identification number for version or connections upgrades. Zero when Main (i.e., anchor) license. |
| Signature | Encryption or digital signature of the above clear-text. |

APPENDIX B

| | |
|---|---|
| License File Stamp | Reseller Companion license information identification string. It uses "RLS" to identify that the license in the file is a Reseller Companion add-on type of license. |
| License Version | The version of the Reseller Companion license format. |
| Time Of Purchase | Point of sale time and license creation time. |
| DealerID | Unique identifier for Reseller/Creator of license. |
| User Name | Name of purchasing company's contact person. |
| Company Name | The name of the company purchasing the license |
| License Flags | Flags that indicate Reseller Companion license status. |
| Serial Number | The identification number of the Main license that is required here regardless of whether this license is a companion to the Main or an Upgrade license. The serial number must remain with the server that it is installed on for the life of the server. |
| Upgrade ID | The identification number of the Upgrade license that this Reseller Companion license will accompany. |
| Signature | This portion of the license is the encryption or digital signature of the above clear-text information that is used later on to validate the contents of the license. |

We claim:

1. A method of electronic licensing comprising the steps of:

creating, using a first computer system, a plurality of licenses independent of a manufacture of a product, each of said plurality of licenses stored in a license document;

storing said plurality of licenses in a database in a second computer system;

extracting from said database one or more licenses from said plurality of licenses;

installing said one or more licenses on a third computer system independent of an installation of said product, wherein said third computer system operates independently of and separate from said first and second computer systems; and validating said one or more licenses using a license enforcement process executing in said third computer system.

2. The method of claim 1 wherein said first computer system and said second computer system comprise a single system.

3. The method of claim 1 wherein said one or more licenses consist of anchor, upgrade and companion licenses.

4. The method of claim 3 wherein said anchor license is the first license that is installed on said third computer.

5. The method of claim 3 wherein said upgrade license is installed to upgrade said anchor license.

6. The method of claim 5 wherein said anchor license licenses a version of said product and said upgrade license licenses another version of said product.

7. The method of claim 5 wherein said anchor license licenses a number of connections to said product for said third computer system and said upgrade modifies said number of connections.

8. The method of claim 3 wherein said companion license contains additional licensing information.

9. The method of claim 3 wherein said companion license is associated with said anchor license.

10. The method of claim 3 wherein said companion license is associated with said upgrade license.

11. The method of claim 1 wherein said creation step creates a license document for each of said plurality of licenses.

12. The method of claim 1 wherein said installation step installs a license document associated with each of said one or more licenses on a storage media in said third computer system.

13. The method of claim 1 wherein said extraction step consists of:

generating decoded documents for each license document associated with each of said one or more licenses, each of said decoded documents consisting of a clear text portion and a digest portion;

copying said decoded license documents to a distribution media.

14. The method of claim 13 further including the steps of:

calculating a new digest of said clear text portion of each of said decoded license documents;

comparing said digest portion and said new digest for each of said decoded license documents;

terminating said extraction when a digest portion and a new digest in one of said decoded license documents are not equal.

15. A method of validating an electronic license stored in a license document on a computer system comprising the steps of:

calculating a first message digest from a first portion of said license document;

generating a second message digest by decoding a second portion of said document;

comparing said first message digest and said second message digest;

removing said electronic license from said computer system when said first message digest is not equal to said second message digest.

16. The method of claim 15 wherein said electronic license is linked to a plurality of electronic licenses in a license chain further comprising the steps of:

identifying an anchor license, said anchor license being the first electronic license in said license chain;

for each upgrade license that succeeds said anchor license:
  a. comparing an upgrade license's serial number with said anchor license's serial number;
  b. removing said upgrade license from said license chain when said serial numbers are not equal;
  c. determining a current maximum number of connections allowed by said upgrade license's predecessor license;
  d. comparing said current maximum number of connections allowed with said upgrade license's previous number of connections allowed;
  e. removing said upgrade license from said license chain when said current maximum number of connections allowed is not equal to said previous number of connections allowed.

17. The method of claim 16 wherein a plurality of electronic licenses in said license chain have a companion license, further comprising the steps of:

identifying said companion license for one of said plurality of electronic licenses;

calculating a first message digest from a first portion of said companion license;

generating a second message digest by decoding a second portion of said companion license;

comparing said first message digest and said second message digest; and removing said companion license and said one of said plurality of electronic licenses from said license chain when said first message digest is not equal to said second message digest.

18. A method of creating an electronic license comprising the steps of:

determining values for information fields that define said electronic license;

storing said values in a first portion of a license document associated with said electronic license;

calculating a first digest of said first portion of said license document;

generating an encoded version of said first portion of said license using an encryption key;

storing said encoded version in a second portion of said license document.

19. A method of installing an electronic license comprising the steps of:

copying said electronic license to a computer system's store;

performing the following steps when said electronic license is an upgrade license:
  a. obtaining an anchor serial number from an anchor license in said license chain;
  b. comparing an upgrade serial number of said upgrade license with said anchor serial number;
  c. removing said upgrade license from said computer system's store when said anchor serial number and said upgrade serial number are not equal;
  d. determining a current maximum number of connections allowed by said upgrade license's predecessor license;
  e. comparing said current maximum number of connections allowed with said upgrade license's previous number of connections allowed;
  f. removing said upgrade license from said computer system's store when said current maximum number of connections allowed is not equal to said previous number of connections allowed.

20. The method of claim 19 further including the steps of:

copying a companion license to said electronic license to said computer system's store;

validating said companion license;

removing said companion license and said electronic license from said computer system's store when said companion license is invalid and when said electronic license is invalid.

21. A licensing system for software, comprising:

a computer configured to execute the software;

a first license resident in the computer and independent of the software, wherein said license includes an identifier and first access criteria;

a second license independent of said software and having second access criteria; and an access regulator resident in the computer and responsive to said first license, said access regulator being configured to facilitate access to the software according to said first access criteria of said first license, and wherein said access regulator is responsive to said second license to facilitate access to the software according to said second access criteria only if said second license includes a reference to said first license identifier.

22. The licensing system of claim 21, wherein said second license is an upgrade license.

23. The licensing system of claim 21, wherein said second license is a companion license.

24. The licensing system of claim 21, wherein said identifier comprises a serial number.

25. The licensing system of claim 21, wherein said identifier comprises a maximum number of permitted connections.

26. The licensing system of claim 21, further comprising a third license independent of said software and having third access criteria, wherein:

said second license includes an identifier; and said access regulator facilitates access to the software according to the third access criteria only when said third license includes a reference to said second license identifier.

27. The licensing system of claim 21, wherein each of said licenses includes a clear text portion and an encrypted portion.

28. The licensing system of claim 27, wherein said encrypted portion comprises a double-encrypted version of said clear text portion.

29. The licensing system of claim 28, wherein said access regulator is configured to compare said clear text portion and said double-encrypted version, and further wherein said access regulator facilitates access to the software only when said clear text portion corresponds to said double-encrypted version.

30. A licensing system for software, comprising:

a computer system, including:

a memory configured to store the software and a set of access parameters;

an access regulator configured to facilitate access to the software according to said access parameters; and a distribution system remote from said computer system configured to selectively modify said access parameters.

31. The licensing system of claim 31, wherein said distribution system is configured to selectably provide a second license having a second set of access parameters to said memory, and wherein said access regulator is responsive to said second access parameters to facilitate access to the software according to said second access parameters.

32. The licensing system of claim 31, wherein said second license is an upgrade license.

33. The licensing system of claim 31, wherein said second license is a companion license.

34. The licensing system of claim 31, wherein:

said first access parameters include an identifier; and said access regulator facilitates access to the software according to the second access parameters only when said second access parameters include a reference to said identifier.

35. The licensing system of claim 34, wherein said identifier comprises a serial number.

36. The licensing system of claim 34, wherein said identifier comprises a maximum number of permitted connections.

37. The licensing system of claim 34, wherein:

said second access parameters include an identifier;

said distribution system is configured to selectably provide a third license having a third set of access parameters to said memory; and said access regulator facilitates access to the software according to the third access parameters only when said third set of access parameters includes a reference to said second access parameters identifier.

38. The licensing system of claim 30, wherein said access parameters include a clear text portion and an encrypted portion.

39. The licensing system of claim 38, wherein said encrypted portion comprises a double-encrypted version of said clear text portion.

40. The licensing system of claim 39, wherein said access regulator is configured to compare said clear text portion and said double-encrypted version, and facilitates access to the software only when said clear text portion corresponds to said double-encrypted version.

\* \* \* \* \*

UNITED STATES PATENT AND TRADEMARK OFFICE
CERTIFICATE OF CORRECTION

PATENT NO. : 5,553,143
DATED : September 3, 1996
INVENTOR(S) : Ross et al.

It is certified that error appears in the above-indentified patent and that said Letters Patent is hereby corrected as shown below:

Column 22, line 10, change the number "31" to -- 30 --.

Signed and Sealed this

Fourth Day of March, 1997

Attest:

BRUCE LEHMAN

Attesting Officer

Commissioner of Patents and Trademarks